(12) United States Patent
Nagel

(10) Patent No.: US 12,037,752 B2
(45) Date of Patent: Jul. 16, 2024

(54) SYSTEMS, METHODS, AND APPARATUSES FOR DETERMINING MACHINE WEIGHT USING ROLLING RESISTANCE

(71) Applicant: Caterpillar Paving Products Inc., Brooklyn Park, MN (US)

(72) Inventor: Brian D. Nagel, Ramsey, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 302 days.

(21) Appl. No.: 17/692,253

(22) Filed: Mar. 11, 2022

(65) Prior Publication Data

US 2023/0287634 A1    Sep. 14, 2023

(51) Int. Cl.
*E01C 19/00* (2006.01)
*E01C 19/27* (2006.01)
*G01G 19/02* (2006.01)
*G01G 19/03* (2006.01)

(52) U.S. Cl.
CPC .......... *E01C 19/27* (2013.01); *G01G 19/022* (2013.01); *G01G 19/03* (2013.01)

(58) Field of Classification Search
CPC ..... E01C 19/27; E01C 19/288; G01G 19/022; G01G 19/03; G01G 19/08; G01G 19/10
See application file for complete search history.

(56) References Cited

U.S. PATENT DOCUMENTS

| | | |
|---|---|---|
| 8,858,117 B2 | 10/2014 | Ries et al. |
| 10,920,380 B2 | 2/2021 | Biberdorf et al. |
| 2013/0103268 A1 | 4/2013 | Norton et al. |
| 2014/0343802 A1* | 11/2014 | Pichlmaier ........... A01B 63/112 701/50 |

* cited by examiner

*Primary Examiner* — Ian Jen

(57) ABSTRACT

Systems, methods, and apparatuses can determine weight of a machine using rolling resistance. The machine may be electrified, either all-electrically powered or partially electrically powered. The rolling resistance can be determined based on motor signaling from one or more motor sensors that sense motor characteristics (e.g., drawn current) from one or more electric motors that drive the machine. The weight of the machine can be determined using the determined rolling resistance. Weight information can be output for display on a display and/or for storing in computer-readable storage onboard and/or offboard the machine.

20 Claims, 3 Drawing Sheets

SYSTEMS, METHODS, AND APPARATUSES FOR DETERMINING MACHINE WEIGHT USING ROLLING RESISTANCE

TECHNICAL FIELD

The present disclosure relates to determining weight of a machine, particularly a compacting machine, based on rolling resistance of the compacting machine.

BACKGROUND

Compactor machines, also known as compactors or compaction machines, are frequently employed to compact dirt, gravel, asphalt, and other compactable surfaces associated with roadbed and other land areas. As used herein, such surfaces may be called compaction surfaces.

One type of compaction machine is a pneumatic wheel roller-style compactor. Such pneumatic compactors generate compaction by applying contact pressure from tires to the compaction surface. Compaction contact pressure of the tires can vary based on applied load and tire pressure. On a multi-tire compactor, both the compactor mass at each tire and individual tire pressures can vary. This can result in uneven ground contact pressure and thus uneven compaction effort.

U.S. Patent Application Publication No. 2013/0103268 ("the '268 patent publication") describes a pneumatic compactor having a plurality of pneumatically inflated tires. The '268 patent publication describes that a controller may be programmed with relevant parameters of the pneumatic compactor, including, for instance, compaction surface, overall machine weight, number of tires, ambient temperature, and tire ground contact area. According to the '268 patent publication, armed with these parameters the controller may be programmed to automatically calculated an appropriate ground contact pressure, display the same for the operator while recording the same for future reference, and adjust the contact pressure in real time for achieving maximum compaction efficiency.

SUMMARY

According to an aspect of the present disclosure a method is described or implemented. The method can comprise: with an electrified compactor machine having a plurality of front tires and a plurality rear tires moving, receiving, at a processor, from one or more motor sensors, motor-signal signaling corresponding to torque of one or more electric motors driving the movement of the electrified compactor machine; with the electrified compactor machine moving, receiving, at the processor, from an angle sensor, angle signaling indicating an angle of incline or decline of the electrified compactor machine; determining, using the processor, a weight of the electrified compactor machine using the motor-signal signaling from said receiving the motor-signal signaling and said angle signaling from said receiving the angle signaling; and outputting, using the processor, weight signaling corresponding to the determined weight for display of weight-indicating indicia on a display.

According to another aspect of the present disclosure, a non-transitory computer-readable storage medium having stored thereon instructions that, when executed by one or more processors associated with a compactor having a plurality of compacting tires, causes the one or more processors to perform a method, is disclosed, provided, or implemented. The method can comprise: with the compactor moving on a surface, processing motor signaling from one or more motor sensors indicative of torque for one or more electric motors causing the compactor to move; with the compactor moving on the surface, processing angle signaling from an angle sensor indicative of an angle of the compactor; determining a rolling resistance of the compactor from the motor signaling from the one or more motor sensors indicative of torque and the angle signaling from the angle sensor indicative of the angle of the compactor; determining weight information associated with the compactor from the determined rolling resistance; and controlling output of an indicator of weight of the compactor based on the determined weight information.

According to yet another aspect of the present disclosure, an all-electric multi-tire compactor is disclose or provided. The compactor can comprise: a frame; a plurality of pneumatic tires in supporting relationship with the frame, including a front set of pneumatic tires and a rear set of pneumatic tires; a plurality of electric motors to drive the pneumatic tires, including a first electric motor set of one or more electric motors to drive the front set of pneumatic tires and a second electric motor set of one or more electric motors to drive the rear set of pneumatic tires; a plurality of current sensors associated with the plurality of electric motors to sense current drawn by the electric motors during operation of the compactor; an angle sensor to sense front-rear pitch of the compactor; one or more pressure sensors to sense air pressure of the pneumatic tires; a display; and electronic control circuitry. The electronic control circuitry can be configured to receive signals from the current sensors, the angle sensor, and the one or more pressure sensors when the compactor is driven forward by a first predetermined amount and in reverse by a second predetermined amount on a surface having a hardness at or above a predetermined hardness value, determine a rolling resistance of the compactor based on the received signals from the compactor being driven forward by the first predetermined amount and in reverse by the second predetermined amount on the surface having the hardness at or above the predetermined hardness value, determine a weight of the compactor based on the determined rolling resistance, and control the display to output an indication of the determined weight of the compactor.

DETAILED DESCRIPTION

The present disclosure relates to determining weight of a machine, particularly a compacting machine, using determined rolling resistance of the compacting machine.

Figure 1:
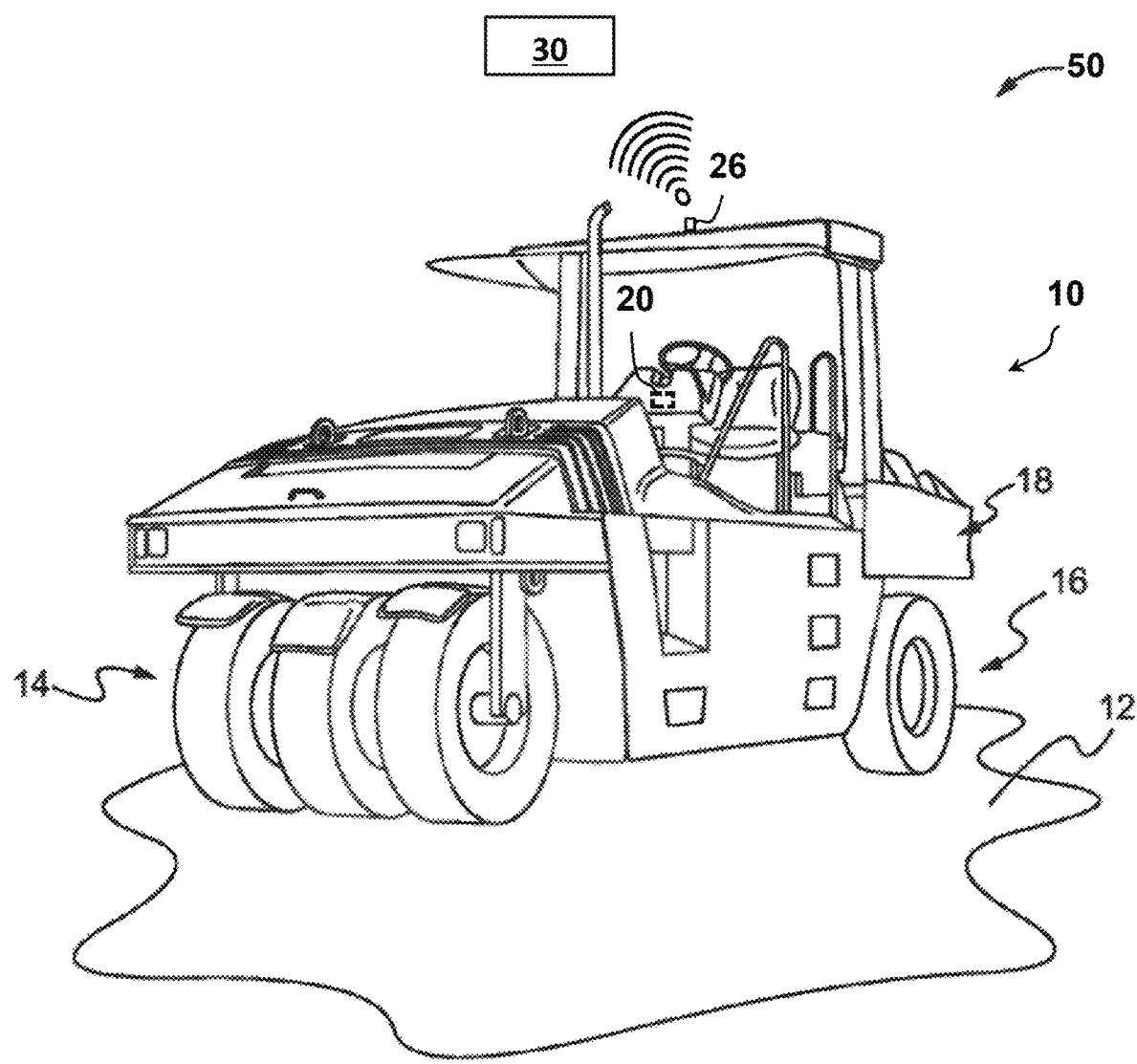
FIG. 1 shows a system including a compactor machine according to one or more embodiments of the disclosed subject matter.

Referring to the figures, FIG. 1 shows a system 50 comprised of a compactor machine 10 according to one or more embodiments of the disclosed subject matter. As noted above, compactor machines may also be known as compactors or compaction machines. The compactor machine 10 can be used to compact or increase density of a compaction surface 12, such as dirt, gravel, concrete, and/or bituminous mixtures (e.g., asphalt).

Optionally, the system 50 may be comprised of an offboard device or system 30, which may be local to the compactor machine 10 or remote from the compactor machine 10. The compactor machine 10 and the offboard system 30 may communicate with each other wirelessly, via one or more wireless networks, using communication circuitry 26 (e.g., antenna, transmitter, receiver, interfaces, etc.) of the compactor machine 10, under control of a controller 20 of the compactor machine 10.

The compactor machine 10 shown in FIG. 1 is a pneumatic wheel roller-style compactor machine, though embodiments of the disclosed subject matter are not so limited. The compactor machine 10 may have a set of front compacting wheels and corresponding tires 14 and a set of rear compacting wheels and corresponding tires 16. Thus, the tires 14, 16 may be referred to or characterized as compaction or compacting tires. Further, some or all of the tires 14 and/or some or all of the tires 16 may be pneumatically inflated tires. Thus, according to one or more embodiments, some or all of the tires 14 and/or some or all of the tires 16 may be referred to or characterized as pneumatic tires. Both the front and rear sets of tires 14, 16 can be rotatably mounted on a frame or chassis 18 of the compactor machine 10.

Though the compactor machine 10 is shown as including a plurality of tires for the front set of tires 14, embodiments of the disclosed subject matter are not limited to the number of tires shown. For example, the front set of tires 14 may include only one tire, only two tires, or more than two tires (e.g., three tires). The foregoing is equally applicable to the rear set of tires 16. Moreover, the front set of tires 14 may be different in number or the same in number as the rear set of tires 16. Additionally, the plurality of tires of each of the respective front and rear sets 14, 16 may be structurally and operatively equivalent, or in some instances, the size and structure of the front and rear tires 14, 16 may deviate with respect to each other. As a non-limiting example, the compactor machine 10 may have a total of seven to thirteen wheels and tires (total for front tires 14 and rear tires 16).

It will be appreciated that performance of a pneumatic compactor machine, such as compactor machine 10, can vary as a function of at least tire inflation pressure, i.e., tire pressure, and the softness or hardness of the surface being compacted, i.e., the compaction surface 12. For example, low tire inflation pressures may generally improve traction and durability of the compactor machine 20 on softer ground, for example, while higher tire inflation pressures may provide more efficient results on firmer surfaces. Hence, tire pressure can impact rolling resistance of the tires 14, 16 and thus the effort the compactor machine 10 must undertake to move in a given direction. For instance, the greater the tire pressure the less contact area that may occur between the tire 14, 16 and the compaction surface 12, which can lead to a decrease in rolling resistance. Similarly, the lower the tire pressure the greater contact area that may occur between the tire 14, 16 and the compaction surface 12, which can lead to an increase in rolling resistance. To the extent that the compaction surface 12 may be softer and of lower density in early stages of the compaction process, the compaction surface 12 will generally become increasingly denser and hence more firm after multiple passes of the compactor machine 10 over the compaction surface 12.

The frame 18 may also support one or more ballasts for providing additional weight to the compactor machine 10 in accordance with and/or to meet compaction surface 12 compaction demands. The ballasts can take the form of material loaded onto the compactor machine 10, for instance, water, sand, liquid antifreeze solutions, steel (e.g., steel blocks), or combinations of some or all of the foregoing. In the case of a liquid ballast, the ballast may be referred to or characterized as a ballast tank. Optionally, one or more of such ballasts for providing weight may be provided on or to the compactor machine 10 according to an asymmetrical configuration. For instance, ballasts provided in association with the front of the compactor machine 10 may create more weight at the front of the machine 10 than ballasts provided in association with the rear of the compactor machine 10 (including no ballast) or vice versa. Additionally or alternatively, ballasts provided in association with the left side of the compactor machine 10 may create more weight at the left side of the compactor machine 10 than ballasts provided in association with the right side of the compactor machine 10 (including no ballast) or vice versa.

The compactor machine 10 may be a so-called electrified or electric machine, which can mean that the compactor machine 10 uses one or more electric motors entirely or partially to move the compactor machine 10, rather than an internal combustion engine, for instance. Here, when only one or more electric motors are implemented to drive the compactor machine 10, the compactor machine 10 may be referred to or characterized as an all-electric compactor machine 10.

Figure 2:
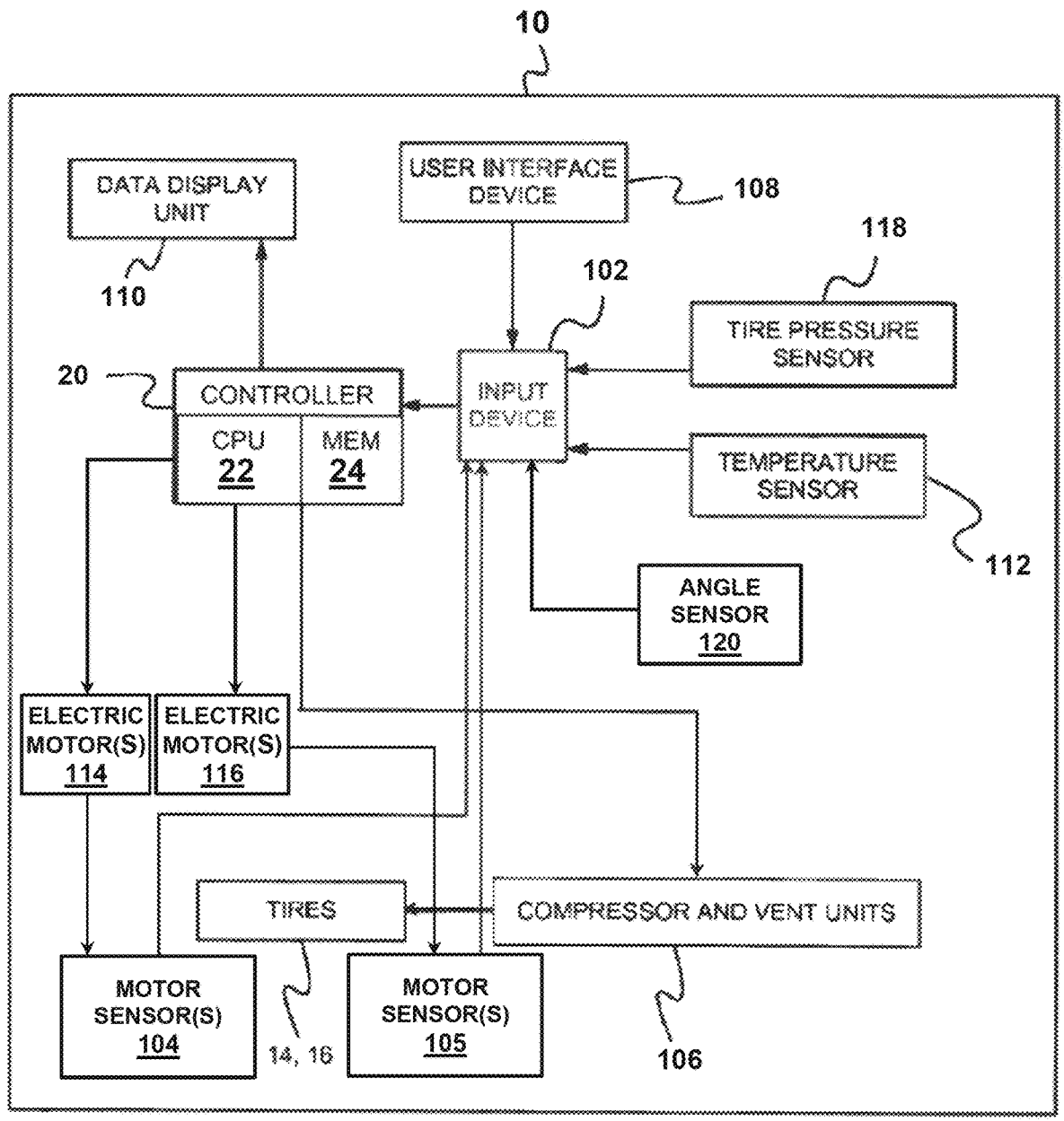
FIG. 2 is a block diagram of a compactor machine according to one or more embodiments of the disclosed subject matter.

Turning to FIG. 2, FIG. 2 is a block diagram of a compactor machine, such as the compactor machine 10 show in FIG. 1, according to one or more embodiments of the disclosed subject matter.

The compactor machine 10 can be comprised of the controller 20, an input device 102, and one or more electric motors 114, 116. Optionally, the input device 102 may be part of the controller 20 or vice versa. Here, one or more of the front wheels and tires 14 may be driven by one or more electric motors 114. Additionally or alternatively, one or more of the rear wheels and tires 16 may be driven by one or more electric motors 116. The one or more electric motors 114 to drive the front wheels and tires 14 may be referred to or characterized as a first electric motor set (of one or more electric motors 114). Likewise, the one or more electric motors 116 to drive the rear wheels and tires 16 may be referred to or characterized as a second electric motor set (of one or more electric motors 116). According to one or more embodiments, the electric motor(s) 114 may be in one-to-one correspondence with the front tires 14 and/or the electric motor(s) 116 may be in one-to-one correspondence with the rear tires 16. Alternatively, one electric motor of the one or more electric motors 114 may drive multiple front tires 14 and/or one electric motor of the one or more electric motors 116 may drive multiple rear tires 16.

In the case of one or more of the tires 14 being pneumatic tires and/or one or more of the tires 16 being pneumatic tires, the compactor machine 10 can include a compressor and ventilation assembly 106. The compressor and ventilation assembly 106 can be operatively coupled to the pneumatic tire(s) 14 and/or the pneumatic tire(s) 16 to adjust air pressure of the pneumatic tire(s) 14, 16. The controller 20 may send control signals (i.e., control signaling) to the compressor and ventilation assembly 106 to adjust the air pressure of the pneumatic tire(s).

Optionally, the compactor machine 10 can have one or more temperature sensors 112. The one or more temperature sensors 112 can detect or determine an ambient temperature associated with the machine 10, such as a temperature at or adjacent to the compaction surface 12, for instance, in front of and/or behind the tires 14, 16. According to one or more embodiments, the temperature sensor 112 may be provided in association with some or all of the tires 14, 16. The one or more temperature sensors 112 may be implemented because temperature of the compaction surface 12 (e.g., hot asphalt) can affect characteristics of the tires 14, 16, such as contact surface characteristics of the tires 14, 16 that may impact or affect rolling resistance of the compactor machine 10. Temperature signals from the one or more temperature sensors 112 can be provided to the input device 102. Such temperature signals, or processed variations thereof, can be further provided from the input device 102 to the controller 20. Though the signals from the temperature sensor 112 are shown in FIG. 2 as being provided to the input device 102, which may send the signals, or processed variations thereof, to the controller 20, such signals may instead be provided directly to the controller 20.

Optionally, the compactor machine 10 can have one or more pressure sensors 118 to sense or determine air pressure of one or more pneumatic tires of the front tire(s) 14 and/or one or more pneumatic tires of the rear tire(s) 16. Optionally, the one or more pressure sensors 118 can detect or determine tire pressure of each tire 14, 16 individually. Thus, according to one or more embodiments, each tire of the sets of tires 14, 16 may have associated therewith a corresponding tire pressure sensor 118. The one or more pressure sensors 118 may be implemented because tire pressure, i.e., changing the size/shape of the tires by inflation or deflation, can influence how the tire 14, 16 compact the compaction surface 12. Tire pressure can also impact rolling resistance of the compactor machine 10 during compaction. For instance, higher tire air pressure can mean a smaller tire contact area that contacts the compaction surface 12 and therefore a decrease in rolling resistance, whereas lower tire air pressure can mean greater tire contact area with the compaction surface 12 and therefore an increase in rolling resistance. Tire pressure signals from the one or more pressure sensors 118 can be provided to the input device 102. Such tire pressure signals, or processed variations thereof, can be further provided from the input device 102 to the controller 20. Though the signals from the pressure sensor 118 are shown in FIG. 2 as being provided to the input device 102, such signals may instead be provided directly to the controller 20.

The compactor machine 10 can also have an angle sensor 120. The angle sensor 210 can sense one or more angles of the compactor machine 10, for instance, front-rear pitch or an angle of the front of the compactor machine 10 compared to the rear of the compactor machine 10. Thus, the angle sensor 210 can be used to determine whether the compactor machine 10 is on an incline or a decline, for instance, going up a hill or down a hill, respectively, or a flat or substantially flat surface. As an example, the angle sensor 120 can be a three-axis angle sensor. Angle signals from the angle sensor 120 can be provided to the input device 102. Such angle signals, or processed variations thereof, can be further provided from the input device 102 to the controller 20. Though the signals from the angle sensor 120 are shown in FIG. 2 as being provided to the input device 102, such signals may instead be provided directly to the controller 20.

The compactor machine 10 can have one or more front machine sensors 104 and/or one or more rear machine sensors 105. Each of the front machine sensor(s) 104 can sense characteristics of the electric motor(s) 114, and each of the rear machine sensor(s) 105 can sense characteristics of the electric motor(s) 116. According to one or more embodiments, the machine sensors 104, 105 can sense torque-related and/or power-related characteristics of the electric motors 114, 116, particularly when the compactor machine 10 is moving under the power of the electric motor(s) 114, 116. For instance, the machine sensors 104, 105 can sense current drawn by the electric motors 114, 116 as the compactor machine 10 is moving under the power of the electric motor(s) 114, 116. Here, it is noted that, generally, output torque associated with electric motors may be directly proportional to current through the electric motors (e.g., $T=I \cdot K_T$, where I is current through windings and $K_T$ is torque constant specific to motor). It may also be known, generally, how much torque and/or power is/are required to turn each of the wheels/tires 14 and each of the wheels/tires 15. Thus, the machine sensor(s) 104 and the machine sensor(s) 105 can measure, via drawn current, the torque or power associated with the electric motor(s) 114 and the electric motor(s) 116 to drive the compactor machine 10.

Optionally, the measurements from all of the machine sensors 104 can be summed to determine the torque or power to drive the corresponding set of wheels/tires 14, and the measurements from all of the machine sensors 105 can be summed to determine the torque or power to drive the corresponding set of wheels/tires 16. Such summations may be performed by the controller 20. The two summations, i.e., for the front and rear of the compactor machine 10, thus may be summed together, for instance, by the controller 20, to obtain an overall torque or power to move the compactor machine 10. Motor signals from the machine sensor(s) 104 and/or motor signals from the machine sensor(s) 105 can be provided to the input device 102. Such machine signals, or processed variations thereof, can be further provided from the input device 102 to the controller 20. Though the signals from the machine sensor(s) 104 and the machine sensor(s) 105 are shown in FIG. 2 as being provided to the input device 102, such signals may instead be provided directly to the controller 20.

The controller 20 can include a processor or processing circuitry 22 and memory 24. Though memory 24 is illustrated as a separate component from processor 22, the memory 24 may be part of the processor 22 (entirely or in part) or a separate memory device, either as part of the controller 20 or separate from the controller 20 but accessible by the controller 20. The memory 24 can store data corresponding to tire air inflation pressures, weights or loads associated with each particular tire 14, 16 (e.g., at each tire), and compaction surface contact pressures. The data may also include type(s) of tire used on the compactor machine 10, which may include width and/or ground contact area of the types of tire. The data can also include a total number tires of the compactor machine 10, type(s) of compaction surface, and/or ambient temperatures, for instance, associated with the compaction surface. Number and types of tires of the compactor machine 10 may be considered to be a particular configuration of the compactor machine 10.

The compactor machine 10 can, according to one or more embodiments, include or otherwise be associated with a user interface device 108 and/or a data display unit or device 110. Optionally, the data display device 110 may be part of the user interface 108 or vice versa. For instance, some or all of the user interface 108 may be implemented via a graphical user interface (GUI) operationally shown in the display device 110. According to one or more embodiments, the user interface device 108 and/or the data display device 110 can be located offboard the compactor machine 10, for instance, as part of the offboard device 30. Optionally, the user interface device 108 and/or the data display device 110 can be onboard the compactor machine 10 and another user interface device 108 (of same or different type, configuration, etc.) and/or another data display device 110 (of same or different type, configuration, etc.) may be offboard the compactor machine 10, as part of the offboard device 30, for instance.

The user interface 108, which can provide inputs to the input device 102, may enable an operator of the compactor machine 10 to set various settings and/or parameters of the compactor machine 10, such as type of machine, total number of tires, total number of front tires 14, total number of rear tires 16, type of compaction surface 12, type(s) of tires, total machine weight, ballast weight, etc. The data display device 110 may be provided inside a cab or operator area of the compactor machine 10. Additionally or alternatively, as noted above, the user interface device 108 and/or the data display device 110 may be provided offboard the compactor machine 10, for instance, on a display device of the offboard system 30 (e.g., a hand-held device at the worksite and/or a display device at a back office system). The user interface device 108 and/or the data display device 110 provided offboard the compactor machine 10 may be implemented in a case where the compactor machine 10 is autonomously operated, as an example.

Such data display device 110 may provide to an operator (e.g., onboard or offboard) of the compactor machine 10 various pieces of information, including settings, parameters, and operating characteristics of the compactor machine 10, such as a determined weight or determined weight distribution of the compactor machine 10. Determined weight may include weight portions of the compactor machine 10, for instance, a weight associated with a front portion of the compactor machine 10 and a weight associated with a rear portion of the compactor machine 10, as well as a total weight of the compactor machine 10. Thus, the data display device 110 may display one or more weight or mass indications of the compactor machine 10. Further, some or all of the data can be provided on the data display device 110 in real time. Non-limiting examples of the data display device 110 include one or more monitors, one or more computer displays, mobile phones, tablets, etc.

According to one or more embodiments, the user interface 108 may be used to place the compactor machine 10 in a certain mode from among multiple modes. Such modes may include a weight-determining mode and an operational mode (which may include or represent multiple operational modes). Optionally, the weight-determining mode may be initiated prior to operation of the compactor machine 10 in the operational mode. In this case, the weight-determining mode may be referred to or characterized as an initial weight-determining mode. Additionally or alternatively, the compactor machine 10 may be placed in the mode remotely, for instance, via control signaling sent from the offboard device to the controller 20 via the communication circuitry 26.

Generally, the operational mode of the compactor machine 10 may be a mode within which the compactor machine 10 performs compaction operations on the compaction surface 12. In the weight-determining mode, the controller 20 can determine a weight of the compactor machine 10. The weight can be an overall weight of the compactor machine 10 and/or weights associated with one or more portions of the compactor machine 10, such as a weight of the compactor machine 10 at the front of the compactor machine 10 and/or a weight of the compactor machine 10 at the rear of the compactor machine 10.

Determination of the weight (or weights) of the compactor machine 10 can be performed based on signaling from the motor sensor(s) 104 and/or from the motor sensor(s) 105, and particularly can be performed when the compactor machine 10 is moving. The controller 20 can output data pertaining to the determined weight (or weights) of the compactor machine 10 to the data display device 110 for display on the data display device 110 and/or to offboard the compactor machine 10, for instance, to the offboard device 30 via the communication circuitry 26.

According to one or more embodiments, for the initial weight-determining mode the compactor machine 10 can move forward and/or backward in order to determine the weight of the compactor machine 10. The compactor machine 10 may move in the two different directions in the case of the compactor machine 10 being on an incline (or decline) and the directions of movement affecting rolling resistance differently. In a case where the compactor machine 10 is on a flat or relatively flat (at or below a predetermined angle of incline), the compactor machine 10 can move only in one direction to determine the weight of the compactor machine 10.

Thus, according to one or more embodiments, a command may be output on the data display device 110 to instruct the operator to move the compactor machine 10 in the requisite direction(s) to determine the weight of the compactor machine 10. Optionally, the command may indicate the distance to drive in the requisite direction(s), or an indication may be output to the operator when a suitable distance in the requisite direction(s) has been achieved in order to determine the weight of the compactor machine 10. As but one example, the command may indicate for the operator to drive forward for twenty yards, drive in reverse for twenty yards, and then stop.

The weight of the compactor machine 10 can be sensed using at least the signaling from the motor sensor(s) 104 and/or the motor sensor(s) 105 during the movement and output, for instance, when the compactor machine 10 is stopped. Of course, embodiments of the disclosed subject matter are not limited to both directions, the distance values (may be different values and not the same for the different directions), and/or the weight being output only when stopped.

Additionally or alternatively, the weight-determining mode made be implemented at the same time as when the compactor machine 10 is in the operational mode. Here, the controller 20 can continuously or periodically determine weight of the compactor machine 10 as the compactor machine 10 also performs work in the operational mode to compact the compaction surface 12. Thus, according to one or more embodiments, the controller 20 can perform an initial weight-determining operation prior to the compactor machine 10 entering the operational mode, and can also perform continuous or intermittent determination of the weight of the compactor machine 10 as the compactor machine 10 operates in the operational mode.

The weight (which can include overall weight and weight portions, as noted above) can be displayed on the data display device 110 and can be continuously or periodically updated as the compactor machine 10 works in the operational mode and the controller 20 makes further weight determinations. As an example, when the compactor machine 10 has a water spray tank, the controller 20 can perform continuous or periodic weight measurements of the compactor machine 10, since the weight of the compactor machine 10 can change as the water level of the water tank decreases as water is sprayed on the tire(s) 14 and/or tire(s) 16. The weight measurements for the compactor machine 10 may also indicate an amount of water remaining in the water tank, which can be output on the data display device 110 and/or output to offboard the compactor machine 10, for instance, to the offboard device 30.

Weight of the compactor machine 10 can be performed on a predetermined hard surface, such as asphalt or concrete, which may be different from the compaction surface 12 (e.g., soil). Performing the weight determination on a surface having a hardness at or above a predetermined level can make the weight determination more accurate and reliable.

The controller 20 can determine the weight of the compactor machine 10 based on receipt of signals (e.g., via the input device 102) from the machine sensor(s) 104 and/or the machine sensor(s) 105. As noted above, the machine sensors 104, 105 can sense torque-related and/or power-related characteristics of the electric motors 114, 116, such as current drawn by the electric motors 114, 116 as the compactor machine 10 is moving under the power of the electric motor(s) 114, 116. It is also noted again that output torque associated with electric motors may be directly proportional to the current through the electric motors (e.g., $T=I \cdot K_T$, where I is current through windings and $K_T$ is torque constant specific to motor), where it may also be known how much torque and/or power is/are required to turn each of the wheels/tires 14 and each of the wheels/tires 15. Optionally, the controller 20 can add together all of the measurements from all of the machine sensors 104 to determine the torque or power to drive the corresponding set of wheels/tires 14. The controller 20 can also add together all of the measurements from all of the machine sensors 105 to determine the torque or power to drive the corresponding set of wheels/tires 16. And the controller 20 may also add together to summations for the front and rear wheels/tires 14, 15 to obtain an overall torque or power to move the compactor machine 10.

In addition to the signals from the machine sensor(s) 104 and/or the machine sensor(s) 105, the controller 20 can determine the weight of the compactor machine 10 based on receipt of signals (e.g., via the input device 102) from the angle sensor 120. Signals from the angle sensor 120 may be factored in to the determination of the weight of the compactor machine 10, particularly in a case where the compactor machine 10 is on an incline (or decline). This can be because torque can be affected by whether the compactor machine 10 is moving up an incline or moving down an incline. Accordingly, whether the compactor machine 10 is moving up an incline or moving down the incline can be used to determine an amount of torque associated with the movement of the compactor machine 10. In that the amounts can differ, the compactor machine 10 can be driven forward (e.g., up an incline), for instance, by a first predetermined distance, and driven in reverse (e.g., back down the incline), for instance, by a second predetermined distance. The first and second predetermined distances may be different. Thus, the controller 20 can account for going up the incline and down the incline and make adjustments for the torque. Optionally, the adjustments can be based on a lookup table of adjustment values based on incline/decline correlated to torque, which may be saved in the memory 24. As noted above, in a case where signals from the angle sensor 120 indicate that the compactor machine 10 is on a flat surface (or substantially flat surface, for instance, a grade of a predetermined amount or less), the compactor machine 10 may be driven only in one direction (forward or reverse) to determine torque and hence weight of the compactor machine 10.

Optionally, signals from the pressure sensor(s) 118 may be used to determine the weight of the compactor machine 10. The signals may be representative of tire pressure of one or more of the front tire(s) 14 and/or one or more of the rear tire(s) 16. A reason tire pressure may be used to determine the weight of the compactor machine 10 can be because tire pressure can affect rolling resistance.

Optionally, signals from the temperature sensor(s) 112 may be used to determine the weight of the compactor machine 10. The signals may be representative of temperature of a contact surface of one or more of the front tire(s) 14 and/or one or more of the rear tire(s) 16. A reason contact surface temperature may be used to determine the weight of the compactor machine 10 can be because temperature can affect the surface characteristics of the tires 14, 16 and/or the surface over which the compactor machine 10 is moving or will move, which, in turn, can affect rolling resistance.

Rolling resistance associated with the movement (e.g., including movement in forward and/or reverse directions) of the compactor machine 10, which may be used to determine weight (or weights) of the compactor machine 10, can be determined based on the signals from the machine sensor(s) 104 and/or the machine sensor(s) 105. The signals from the angle sensor 120 may also be used to determine the rolling resistance of the compactor machine 10. Optionally, the signals from the pressure sensor(s) 118 and/or the temperature sensor(s) 112 can be used to determine the rolling resistance of the compactor machine 10. Generally, rolling resistance may be determined, by the controller 20, using, for instance, the equation $F_r = c_i W/r$, where $F_r$ is the rolling resistance, $c_i$ is a rolling resistance coefficient, and r is the radius of the wheels associated with the front tire(s) 14 and the rear tire(s) 16. The temperature of the contact surface of the front tire(s) 14 and/or the rear tire(s) 16, via the temperature sensor(s) 112, and/or the tire air pressure of the front tire(s) 14 and/or the rear tire(s) 16, via the pressure sensor(s) 118, may be used to set the rolling resistance coefficient $c_i$.

The controller 20 may determine the weight(s) of the compactor machine 10 using the determined rolling resistance, for instance, using the equation $F_r = c_i W$, where W is the weight of the compactor machine 10 or a weight of a particular portion thereof, such as the rear of the compactor machine 10 or the front of the compactor machine 10. In that W can equal m (mass) times ag (acceleration of gravity), movement of the compactor machine 10 on an incline (e.g., forward and/or rearward) can affect the weight measurement. Thus, signals from the angle sensor 120 can be used to determine the weight(s) of the compactor machine 10, particularly to accommodate for the effects of gravity on torque-related measurements as the compactor machine 10 moves on the inclined/declined surface.

Optionally, the weight determination can be performed using one or more lookup tables having precalculated values of weight relative to the input signals from the various sensors. For instance, the lookup table may correlate sensed current or torque from the motor sensor(s) 104, 105 and a sensed angle of the compactor machine 10 from the angle sensor 120 to rolling resistance of the compactor machine 10, where rolling resistance can be correlated to weight of the compactor machine 10. The one or more lookup tables may be stored in the memory 24 and accessed by the processor 22 to perform the weight calculations.

The determined weight (or weights) of the compactor machine 10 can be output. For instance, the weight(s) of the compactor machine 10 can be displayed on the data display device 110, under control of the controller 20. An indication of the overall determined weight of the compactor machine 10 can be displayed on the data display device 110. Additionally or alternatively, weights of specific portions of the compactor machine 10 can be displayed on the data display device 110. For instance, a weight associated with the front of the compactor machine 10 and a weight associated with a rear of the compactor machine 10 may be displayed. A total weight of the compactor machine 10, which may be a summation of the front and rear weights, can be additionally or alternatively displayed on the data display device 110.

The current determined weight can be output on the data display device 110 continuously, for instance, in a case where the controller 20 continuously determines the weight of the compactor machine 10. Alternatively, the determined weight can be output on the data display device 110 so as to be updated with the current determined weight periodically, in a case where the weight of the compactor machine 10 is determined periodically, for instance, in response to an operator input to the user interface device 108 or according to a predetermined frequency. Further, the determined weight of the compactor machine 10 can be output as part of an initial weight-determining mode and/or during an operational mode of the compactor machine 10, which may occur after the initial weight-determining mode. In the operational mode the weight of the compactor machine 10 can be determined continuously or periodically. Thus, the current weight of the compactor machine 10 can be updated on the data display device 110 continuously or periodically, depending upon the frequency of determining the weight of the compactor machine 10.

Additionally or alternatively, the determined weight (or weights) of the compactor machine 10 can be output offboard the compactor machine 10, for instance, to the offboard device or system 30. In this regard, the offboard system 30 may be referred to or characterized as "the cloud." The offboard device 30 may additionally or alternatively be a hand-held wireless electronic device (e.g., tablet, cellular phone, etc.) at the worksite of the compactor machine 10. Here, the offboard system 30 in the form of the "cloud" or "back office system" may be characterized as "remote" from the compactor machine 10, whereas the offboard device 30 in the form of the hand-held wireless electronic device may be characterized as "local" to the compactor machine 10. Data corresponding to the determined weight(s) of the compactor machine 10 and optionally data from some or all of the sensors contributing to the weight calculation can be sent offboard the compactor machine 10 and can be tied to a date, time, location, job, etc. Optionally, some or all of such data can be stored in the memory 24 for later offload from the compactor machine 10. In some cases, the data can be used to update the one or more lookup tables that may be stored in the memory 24. The determined weight(s) of the compactor machine 10 and optionally data from some or all of the sensors contributing to the weight calculation can be sent offboard the compactor machine 10 wirelessly via one or more wireless networks using, for instance, the communication circuitry 26.

INDUSTRIAL APPLICABILITY

As noted above, the present disclosure relates to determining weight of a machine, particularly a compacting machine, using rolling resistance of the compacting machine.

Compactors, such as pneumatic compactors, may be ballasted to different weights depending upon job requirements, compaction surface characteristics, etc. However, where and how much weight to add, done manually, may essentially be a guessing game. This may become even more of an issue when a scale to measure the weight of the compactor machine is not available.

Embodiments of the disclosed subject matter, generally, can implement one or more electric motors to drive wheels/tires of the compactor machine, whereby the torque used to drive the compactor machine and optionally a sensed travel-direction angle of the compactor machine can be used to determine weight or weights associated with the compactor machine. The compactor machine may be electrified, either all-electrically powered or partially electrically powered. Optionally, tire pressure and/or tire contact surface temperature can be sensed and used to determine the weight of the compactor machine. Thus, an accurate measurement of ballast weighting for the compactor machine can be determined and modified, if needed.

\Systems, methods, and apparatuses according to embodiments of the disclosed subject matter can determine weight of a machine using rolling resistance. The rolling resistance can be determined based on signaling from one or more motor sensors (e.g., current sensors) that sense torque- or power-related characteristics (e.g., current) from one or more electric motors that drive the machine. The weight of the machine can be determined using the determined rolling resistance. Weight information can be output for display on a display and/or for storing in computer-readable storage onboard and/or offboard the machine.

Figure 3:
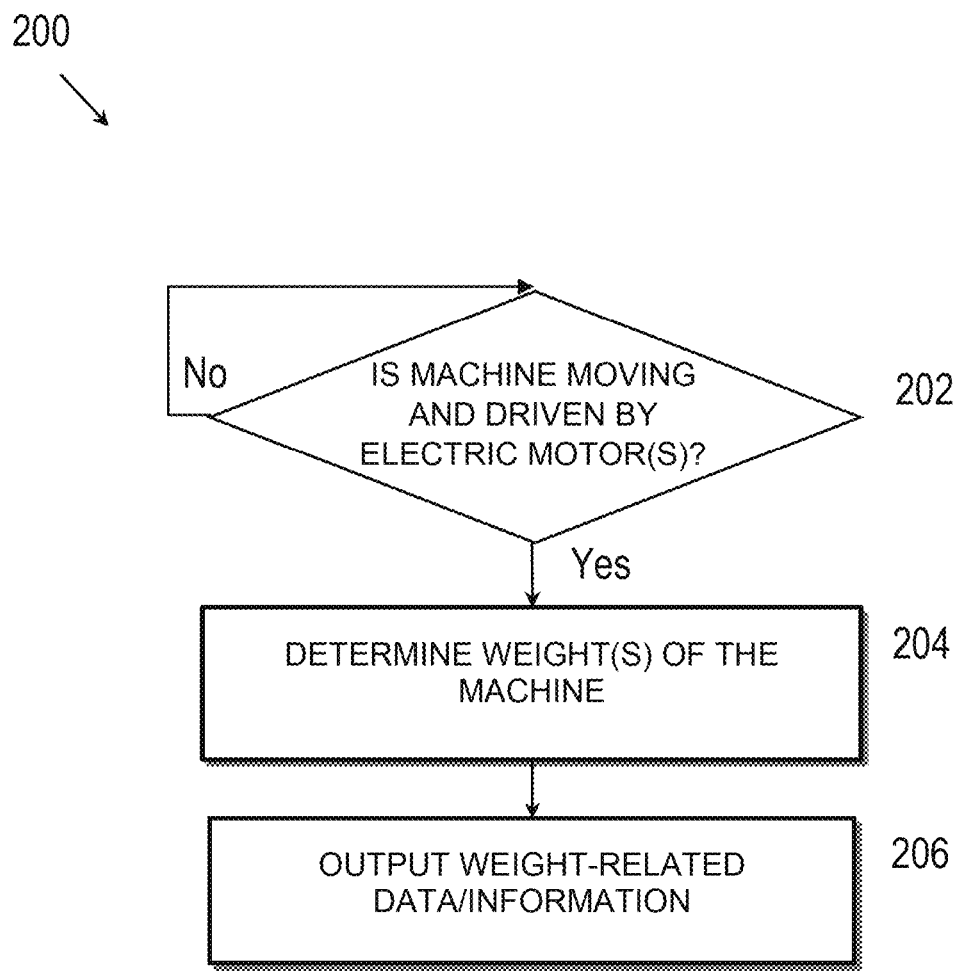
FIG. 3 is a flow chart of a method according to one or more embodiments of the disclosed subject matter.

FIG. 3 is a flow chart of a method 200 according to embodiments of the disclosed subject matter. Some or all of the method 200 can be performed via a non-transitory computer-readable storage medium (or media) having stored thereon instructions that, when executed by one or more processors, such as processor(s) 22, causes the one or more processors 22 to perform some or all of the method 200. According to one or more embodiments, the method 200 may be referred to or characterized as a method for determining one or more weights of a compactor machine, such as the compactor machine 10 shown in FIG. 1.

At 202, the method 200 can determine whether the compactor machine 10 is moving and being driven by one or more electric motors 114 and/or one or more electric motors 116. Further, such movement can be under a weight-determining mode or an operational mode of the compactor machine 10, such as discussed above. This determination can be made by the controller 20 based on inputs from the compactor machine 10, such as from speed sensors, a navigation system (e.g., GPS, INS, etc.), machine sensor(s) 104, and/or machine sensor(s) 105.

If the method 200, at 202, determines that the compactor machine 10 is moving and driven by the one or more electric motors 114 and/or one or more electric motors 116, the method 200 can determine weight of the compactor machine 10. The weight of the compactor machine 10 (including weights) can be determined with the compactor machine 10 being driven by the one or more electric motors 114 and/or one or more electric motors 116.

The weight of the compactor machine 10 can be determined, for instance, by the controller 20, based on signaling from the motor sensor(s) 104 and/or from the motor sensor(s) 105. The machine sensors 104, 105 can sense torque-related and/or power-related characteristics of the electric motors 114, 116, such as current drawn by the electric motors 114, 116 as the compactor machine 10 is being driven by the electric motor(s) 114, 116. In addition to the signals from the machine sensor(s) 104 and/or the machine sensor(s) 105, the controller 20 can determine the weight of the compactor machine 10 based on receipt of signals (e.g., via the input device 102) from the angle sensor 120. Optionally, signals from the pressure sensor(s) 118 and/or the temperature sensor(s) 112 may additionally be used to determine the weight of the compactor machine 10. The weight of the compactor machine 10 can be determined based on rolling resistance of the compactor machine 10, which can be determined based on the signals from the foregoing sensors. The determined weight may include weight associated with portions of the compactor machine 10, for instance, a weight associated with a front portion of the compactor machine 10 and a weight associated with a rear portion of the compactor machine 10, as well as a total weight of the compactor machine 10. The determined weight at the front of the compactor machine 10 may be referred to or characterized as a first weight of the compactor machine 10 and the determined weight at the rear of the compactor machine 10 may be referred to or characterized as a second weight of the compactor machine 10 (or vice versa).

Optionally, operation 204 of the method 200 can include driving the compactor machine 10 using the one or more electric motors 114 and/or one or more electric motors 116 according to a predetermined pattern. The pattern can include driving the compactor machine 10 forward by a first predetermined amount and in reverse or in a direction opposite the forward direction by a second predetermined amount, which may be different from or the same as the first predetermined amount. As noted above, driving the compactor machine 10 in opposing directions may be helpful to reliably determine the weight of the compactor machine 10 when the compactor machine 10 is on an incline/decline.

At 206 the method 200 can include outputting the determined weight of the compactor machine 10. Optionally, data from some or all of the sensors used to determine the weight can be output. The determined weight may be referred to or characterized as weight-related data or information. The data from some or all of the sensors to output may also be referred to or characterized as weight-related data or information.

The data can be output onboard and/or offboard the compactor machine 10. For instance, one or more indications of weight can be displayed on the data display device 110. Such data display device 110 may be onboard the compactor machine 10 or offboard the compactor machine 20 but local to the compactor machine 10, at the worksite. Thus, the data display device 110 may display one or more weight or mass indications of the compactor machine 10. Further, some or all of the data can be provided on the data display device 110 in real time. Non-limiting examples of the data display device 110 include one or more monitors, one or more computer displays, mobile phones, tablets, etc. Additionally or alternatively, the weight-related data or information can be output offboard the compactor machine 10, remotely to the offboard device or system 30. The outputting of weight-related data or information may also include storing such data/information locally in the memory 24 and/or remotely at the offboard device or system 30 (e.g., in "the cloud").

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Further, as used herein, the term "circuitry" can refer to any or all of the following: (a) hardware-only circuit implementations (such as implementations in only analog and/or digital circuitry); (b) to combinations of circuits and software (and/or firmware), such as (as applicable): (i) a combination of processor(s) or (ii) portions of processor(s)/software (including digital signal processor(s)), software and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present. This definition of "circuitry" can apply to all uses of this term in this application, including in any claims. As a further example, as used in this application, the term "circuitry" can also cover an implementation of merely a processor (or multiple processors) or portion of a processor and its (or their) accompanying software and/or firmware.

Use of the terms "data," "content," "information" and similar terms may be used interchangeably, according to some example embodiments of the present disclosure, to refer to data capable of being transmitted, received, operated on, and/or stored. The term "network" may refer to a group of interconnected computers or other computing devices. Within a network, these computers or other computing devices may be interconnected directly or indirectly by various means including via one or more switches, routers, gateways, access points or the like.

Aspects of the present disclosure have been described above with reference to flowchart illustrations and/or block diagrams of methods, apparatus (systems) and computer program products according to embodiments of the present disclosure. In this regard, the flowchart and block diagrams in the Figures illustrate the architecture, functionality, and operation of possible implementations of systems, methods and computer program products according to various embodiments of the present disclosure. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Additionally, it is to be understood that terms such as "left," "right," "top," "bottom," "front," "rear," "side," "height," "length," "width," "upper," "lower," "interior," "exterior," "inner," "outer," and the like that may be used herein, merely describe points of reference and do not necessarily limit embodiments of the disclosed subject matter to any particular orientation or configuration. Furthermore, terms such as "first," "second," "third," etc., merely identify one of a number of portions, components, points of reference, operations and/or functions as described herein, and likewise do not necessarily limit embodiments of the disclosed subject matter to any particular configuration or orientation.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. An all-electric multi-tire compactor comprising:
   a frame;
   a plurality of pneumatic tires in supporting relationship with the frame, including a front set of pneumatic tires and a rear set of pneumatic tires;
   a plurality of electric motors to drive the pneumatic tires, including a first electric motor set of one or more electric motors to drive the front set of pneumatic tires and a second electric motor set of one or more electric motors to drive the rear set of pneumatic tires;
   a plurality of current sensors associated with the plurality of electric motors to sense current drawn by the electric motors during operation of the compactor;
   an angle sensor to sense front-rear pitch of the compactor;
   one or more pressure sensors to sense air pressure of the pneumatic tires;
   a display; and
   electronic control circuitry configured to
      receive signals from the current sensors, the angle sensor, and the one or more pressure sensors when the compactor is driven forward by a first predetermined amount and in reverse by a second predetermined amount on a surface having a hardness at or above a predetermined hardness value,
      determine a rolling resistance of the compactor based on the received signals from the compactor being driven forward by the first predetermined amount and in reverse by the second predetermined amount on the surface having the hardness at or above the predetermined hardness value,
      determine a weight of the compactor based on the determined rolling resistance, and
      control the display to output an indication of the determined weight of the compactor.

2. The all-electric multi-tire compactor according to claim 1, wherein the electric motors are in one-to-one correspondence with the plurality of pneumatic tires.

3. The all-electric multi-tire compactor according to claim 1, wherein the surface is either concrete or asphalt.

4. The all-electric multi-tire compactor according to claim 1, wherein the surface has an angle of incline over which the compactor is driven forward by the first predetermined amount and is driven in reverse by the second predetermined amount.

5. The all-electric multi-tire compactor according to claim 1, wherein the first predetermined amount over which the compactor is driven forward is different from the second predetermined amount over which the compactor is driven in reverse.

6. The all-electric multi-tire compactor according to claim 1, further comprising one or more temperature sensors to sense temperature of one or more of the pneumatic tires, wherein the electronic control circuitry determines the rolling resistance of the compactor based on temperature-related signals from the one or more temperature sensors.

7. The all-electric multi-tire compactor according to claim 1, further comprising communication circuitry,
wherein the electronic control circuitry outputs, via the communication circuitry, the determined weight of the compactor to a back office system via one or more wireless communication networks.

8. The all-electric multi-tire compactor according to claim 1,
wherein the weight of the compactor determined by the electronic control circuitry includes a first weight associated with the pneumatic tires of the front set of pneumatic tires and a second weight associated with the pneumatic tires of the rear set of pneumatic tires, and
wherein the indication output on the display indicates the first weight, the second weight, and a total compactor weight as a sum of the first and second weights.

9. The all-electric multi-tire compactor according to claim 1,
wherein, in an initial weight-determining mode, the electronic control circuitry determines the weight of the compactor from the determined rolling resistance based on the received signals from the compactor being driven forward by the first predetermined amount and in reverse by the second predetermined amount on the surface having the hardness at or above the predetermined hardness value, and
wherein, in an operational mode after the initial weight-determining mode, the electronic control circuitry is configured to
continuously determine the weight of the compactor based on continuously determining the rolling resistance from received signals from the current sensors, the angle sensor, and the one or more pressure sensors, and
control the display to continuously output the indication of the weight of the compactor in the operational mode.

10. A method comprising:
with an electrified compactor machine having a plurality of front tires and a plurality rear tires moving, receiving, at a processor, from one or more motor sensors, motor-signal signaling corresponding to torque of one or more electric motors driving the movement of the electrified compactor machine;
with the electrified compactor machine moving, receiving, at the processor, from an angle sensor, angle signaling indicating an angle of incline or decline of the electrified compactor machine;
determining, using the processor, a weight of the electrified compactor machine using the motor-signal signaling from said receiving the motor-signal signaling and said angle signaling from said receiving the angle signaling; and
outputting, using the processor, weight signaling corresponding to the determined weight for display of weight-indicating indicia on a display.

11. The method according to claim 10,
wherein some or all of the tires are pneumatic tires,
wherein the method further comprises, with the electrified compactor machine moving, receiving, at the processor, from one or more pressure sensors associated with said some or all pneumatic tires, pressure signaling corresponding to sensed pressure of said some or all pneumatic tires, and
wherein said determining the weight of the electrified compactor machine uses the pressure signaling from said receiving the pressure signaling.

12. The method according to claim 10,
wherein the method further comprises, with the electrified compactor machine moving, receiving, at the processor, from one or more temperature sensors, temperature signaling corresponding to sensed contact surface temperature associated with one or more of the tires, and
wherein said determining the weight of the electrified compactor machine uses the temperature signaling from said receiving the temperature signaling.

13. The method according to claim 10, wherein said determining the weight of the electrified compactor machine includes determining a first weight associated with a front end portion of the electrified compactor machine and a second weight associated with a rear end portion of the electrified compactor machine.

14. The method according to claim 10, wherein said determining the weight of the electrified compactor machine includes using a lookup table that correlates the motor-signal signaling and the angle signaling to the weight of the electrified compactor.

15. The method according to claim 10,
wherein said outputting the weight signaling is to offboard the electrified compactor machine to a cloud-based information processing system via a wireless communication network, and
wherein the method further comprises storing, in a computer-readable storage medium of the cloud-based information processing system, weight-related data corresponding to the weight signaling from said outputting the weight signaling.

16. A non-transitory computer-readable storage medium having stored thereon instructions that, when executed by one or more processors associated with a compactor having a plurality of compacting tires, causes the one or more processors to perform a method comprising:
with the compactor moving on a surface, processing motor signaling from one or more motor sensors indicative of torque for one or more electric motors causing the compactor to move;
with the compactor moving on the surface, processing angle signaling from an angle sensor indicative of an angle of the compactor;
determining a rolling resistance of the compactor from the motor signaling from the one or more motor sensors indicative of torque and the angle signaling from the angle sensor indicative of the angle of the compactor;
determining weight information associated with the compactor from the determined rolling resistance; and
controlling output of an indicator of weight of the compactor based on the determined weight information.

17. The non-transitory computer-readable storage medium according to claim 16, further comprising outputting the indicator of weight on one or more displays.

18. The non-transitory computer-readable storage medium according to claim 16, wherein said determining the weight information of the compactor includes determining a first weight information associated with one or more front compacting tires of the plurality of compacting tires and a second weight information associated with one or more rear compacting tires of the plurality of compacting tires.

19. The non-transitory computer-readable storage medium according to claim 16,
wherein some or all of the plurality of compacting tires are pneumatic compacting tires, wherein the method further comprises:
- with the compactor moving on the surface, processing pressure signaling corresponding to sensed pressure of said some or all pneumatic compacting tires; and
- with the compactor moving on the surface, processing temperature signaling corresponding to sensed surface temperature associated with one or more of the pneumatic compaction tires, and wherein said determining the rolling resistance of the compactor is based on the temperature signaling and the pressure signaling.

20. The non-transitory computer-readable storage medium according to claim 16, wherein the compactor moving on the surface for said processing the motor signaling and said processing the angle signaling includes the compactor moving in a first direction and in a second direction opposite the first direction.

* * * * *